US 9,903,263 B2

(12) United States Patent
Ge

(10) Patent No.: US 9,903,263 B2
(45) Date of Patent: Feb. 27, 2018

(54) FUEL REFORMER SYSTEM FOR MULTIPLE COMBUSTION CHAMBERS

(71) Applicant: Caterpillar Inc., Peoria, IL (US)

(72) Inventor: Xinyu Ge, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 86 days.

(21) Appl. No.: 15/163,041

(22) Filed: May 24, 2016

(65) Prior Publication Data

US 2016/0265416 A1 Sep. 15, 2016

(51) Int. Cl.
| | |
|---|---|
| *F02M 1/00* | (2006.01) |
| *F02B 19/10* | (2006.01) |
| *F02B 19/12* | (2006.01) |
| *F02M 21/02* | (2006.01) |
| *F02M 31/20* | (2006.01) |
| *F02D 19/06* | (2006.01) |
| *B01J 8/00* | (2006.01) |
| *C01B 3/38* | (2006.01) |

(52) U.S. Cl.
CPC .............. *F02B 19/10* (2013.01); *B01J 8/00* (2013.01); *C01B 3/382* (2013.01); *C01B 3/384* (2013.01); *F02B 19/1085* (2013.01); *F02B 19/12* (2013.01); *F02D 19/0644* (2013.01); *F02D 19/0671* (2013.01); *F02M 21/0206* (2013.01); *F02M 31/20* (2013.01); *C01B 2203/0233* (2013.01); *C01B 2203/0244* (2013.01); *C01B 2203/0405* (2013.01); *C01B 2203/0872* (2013.01); *C01B 2203/1241* (2013.01); *C01B 2203/141* (2013.01); *C01B 2203/142* (2013.01); *Y02T 10/125* (2013.01); *Y02T 10/126* (2013.01); *Y02T 10/32* (2013.01); *Y02T 10/36* (2013.01)

(58) Field of Classification Search
CPC ........ F02B 17/005; F02B 19/10; F02D 41/40; F02D 41/403; F02D 41/405
USPC .... 123/274, 275, 285–287, 299, 1 A, 27 GE
See application file for complete search history.

(56) References Cited

U.S. PATENT DOCUMENTS

| | | | |
|---|---|---|---|
| 3,908,606 | A | 9/1975 | Toyoda et al. |
| 4,074,661 | A | 2/1978 | Noguchi et al. |
| 4,230,072 | A | 10/1980 | Noguchi et al. |
| 6,739,289 | B2 | 5/2004 | Hiltner et al. |
| 6,843,220 | B2 | 1/2005 | Lausch et al. |
| 7,263,967 | B2 | 9/2007 | Hotta et al. |

(Continued)

FOREIGN PATENT DOCUMENTS

WO 2008106722 9/2008

*Primary Examiner* — John Kwon

(57) ABSTRACT

A system for controlling a flow of a gas stream into a plurality of combustion chambers of an engine is provided. The system comprises a fuel reformer module configured to provide the flow of the gas stream containing hydrogen gas and carbon monoxide gas, a cooler module positioned downstream of the fuel reformer module with respect to the flow of the gas stream. The cooler module is configured to control a temperature of the gas stream. A flow control assembly is positioned downstream of the cooler module and upstream of the plurality of combustion chambers with respect to the flow of the gas stream. The flow control assembly is configured to supply a first effluent stream to a pre-chamber of the plurality of combustion chambers. The flow control assembly also supplies a second effluent stream to a main chamber of the plurality of combustion chambers.

4 Claims, 2 Drawing Sheets

(56) References Cited

U.S. PATENT DOCUMENTS

| | | | |
|---|---|---|---|
| 2002/0103407 A1* | 8/2002 | Hatanaka | C10J 3/723 585/733 |
| 2008/0003163 A1* | 1/2008 | Silver | C01B 3/025 423/352 |
| 2008/0169449 A1* | 7/2008 | Mundschau | B01D 69/141 252/373 |
| 2012/0000435 A1* | 1/2012 | Scotto | H01M 8/04223 123/3 |
| 2014/0216029 A1 | 8/2014 | Gruber et al. | |
| 2014/0224208 A1 | 8/2014 | Gruber et al. | |
| 2015/0354476 A1* | 12/2015 | Ge | F02D 41/0002 60/274 |
| 2017/0051685 A1* | 2/2017 | Scotto | F02D 19/0644 |

* cited by examiner

FUEL REFORMER SYSTEM FOR MULTIPLE COMBUSTION CHAMBERS

TECHNICAL FIELD

The present disclosure relates to a fuel reformer system, and more specifically, to the fuel reformer system for multiple combustion chambers of an engine.

BACKGROUND

A fuel reformer is used for transforming a fuel, e.g. natural gas, into another fuel, known as reformed fuel (i.e. hydrogen gas). The fuel reformer supplies the hydrogen gas to combustion chambers (i.e. a pre-combustion chamber and a main combustion chamber) of an engine to support lean burn technology.

There exist various conventional techniques that control a supply of the reformed fuel into the combustion chambers. One such conventional technique includes a fuel reforming means in which a part of the hydrocarbon fuel is reformed into a mixture of decomposition and oxidation products, which is then introduced into cylinders of the engine. However, such technique may be unable to supply the reformed fuel in varying concentrations and/or proportions into the pre-combustion chamber and the main combustion chamber, and hence may not be viable.

U.S. Pat. No. 7,263,967 (hereinafter referred to as '967 reference), describes an internal combustion engine with auxiliary combustion chamber. The '967 reference describes the internal combustion engine that includes a main combustion chamber, an auxiliary combustion chamber, a fuel reforming unit, and a control unit. The auxiliary combustion chamber is configured and arranged to communicate with the main combustion chamber. The fuel reforming unit is configured and arranged to reform a fuel to produce a reformed gaseous fuel and a reformed liquid fuel. The control unit is configured to execute control such that the reformed gaseous fuel is supplied to the auxiliary combustion chamber when a first operating condition exists and the reformed liquid fuel is supplied to the main combustion chamber when a second operating condition exists.

However, in known solutions may be unable to ensure lean burn combustion in the engine, leading to inefficient and costly operations. Therefore, there is a need for an improved fuel reformer solution for multiple combustion chambers in the engine.

SUMMARY OF THE DISCLOSURE

An aspect of the present disclosure pertains to a system for controlling a flow of a gas stream into a plurality of combustion chambers of an engine. The system comprises a fuel reformer module configured to provide the flow of the gas stream containing hydrogen gas and carbon monoxide gas. The system also comprises a cooler module positioned downstream of the fuel reformer module with respect to the flow of the gas stream. The cooler module is configured to control a temperature of the gas stream. The system also comprises a flow control assembly positioned downstream of the cooler module and upstream of the plurality of combustion chambers with respect to the flow of the gas stream. The flow control assembly is configured to supply a first effluent stream to a pre-chamber of the plurality of combustion chambers. The flow control assembly is configured to supply a second effluent stream to a main chamber of the plurality of combustion chambers. A concentration of the hydrogen gas in the first effluent stream is greater than a concentration of the hydrogen gas in the second effluent stream. Further, a concentration of the carbon monoxide gas in the first effluent stream is lesser than a concentration of the carbon monoxide gas in the second effluent stream.

Other features and aspects of this disclosure will be apparent from the following description and the accompanying drawings.

DETAILED DESCRIPTION

Figure 1:
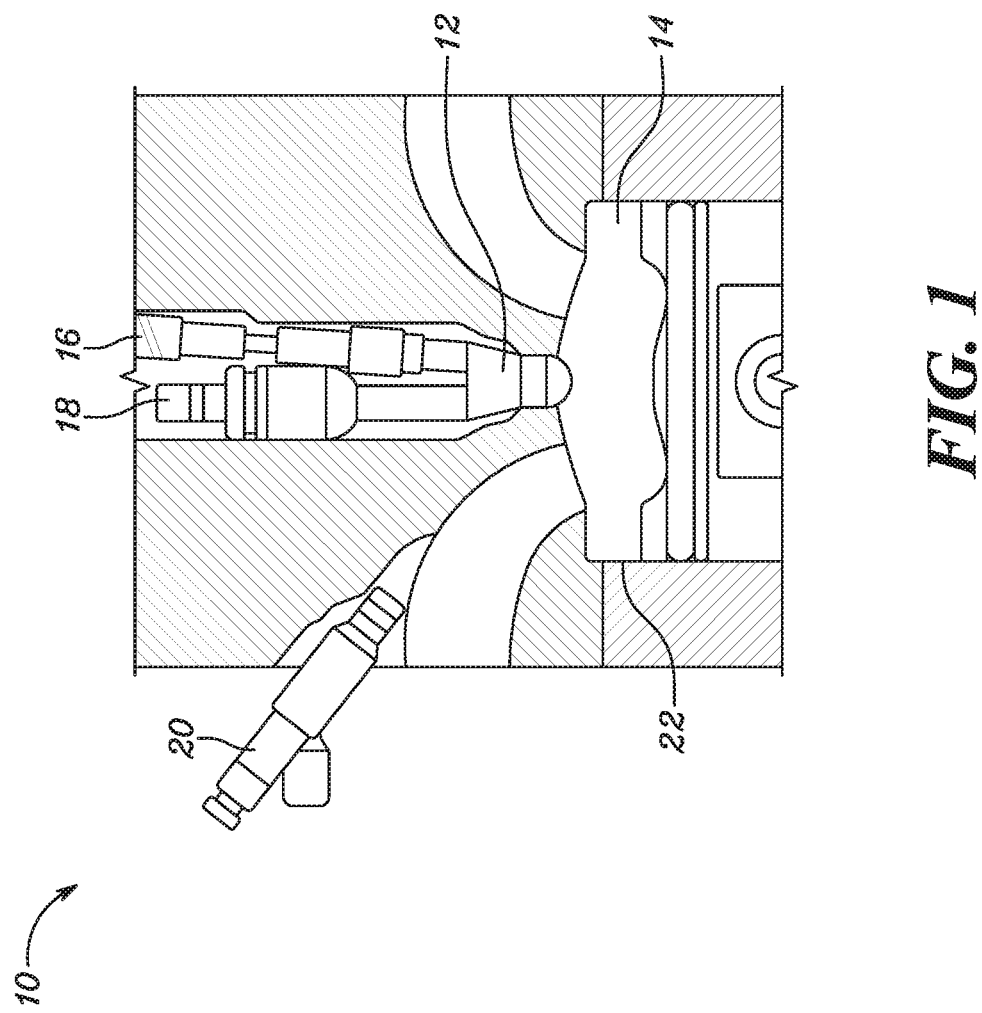
FIG. 1 is a sectional view of a portion of an engine, in accordance with the concepts of the present disclosure.

Referring to FIG. 1, a sectional view of a portion of an exemplary engine 10 is illustrated. The engine 10 is a lean-burn internal engine that utilizes a lean fuel mixture to carry out lean burn combustion. The engine 10 is a four stroke engine that uses four stroke cycles, i.e. intake, compression, power and exhaust for generating power. Alternatively, the engine 10, may include any other internal combustion engine, such as, a spark ignition engine, a compression ignition engine, a natural gas engine, among others to carry out principles of current disclosure without departing from the meaning and scope of the disclosure.

The engine 10 includes a number of combustion chambers, i.e. a pre-combustion chamber 12, hereinafter interchangeably referred to as a pre-chamber 12, and a main combustion chamber 14, hereinafter interchangeably referred to as main chamber 14. The engine 10 further includes a spark plug 16, a first fuel admission valve 18, and a second fuel admission valve 20. The pre-chamber 12 is in fluid communication with the main chamber 14 via orifices (not shown). The spark plug 16 is in fluid communication with the pre-chamber 12 to initiate a first combustion to create jets. The jets may spread around to improve combustion efficiency in the main chamber 14 since the jets may rapidly spread through a volume of a cylinder 22 and may serve as an ignition source for the main chamber 14. A second combustion in the main chamber 14 may take place based on the ignition timing in the pre-chamber 12 as well as based on the spreading of the jets created in the pre-chamber 12.

The first fuel admission valve 18 and the second fuel admission valve 20 may control a flow of the fuel into the pre-chamber 12 and the main chamber 14 respectively. In an embodiment, the first fuel admission valve 18 and the second fuel admission valve 20 are each electronically controlled fuel admission valves, for example, a check valve. The first fuel admission valve 18 and the second fuel admission valve 20 are utilized to accurately control delivery and consistency of the flow of the fuel into the pre-chamber 12 and the main chamber 14 respectively. As an example, it is desired to inject a minimum fuel (e.g. 2% fuel of total delivered fuel to each cylinder, i.e. the cylinder to the pre-chamber 12 for a stable ignition process.

Figure 2:
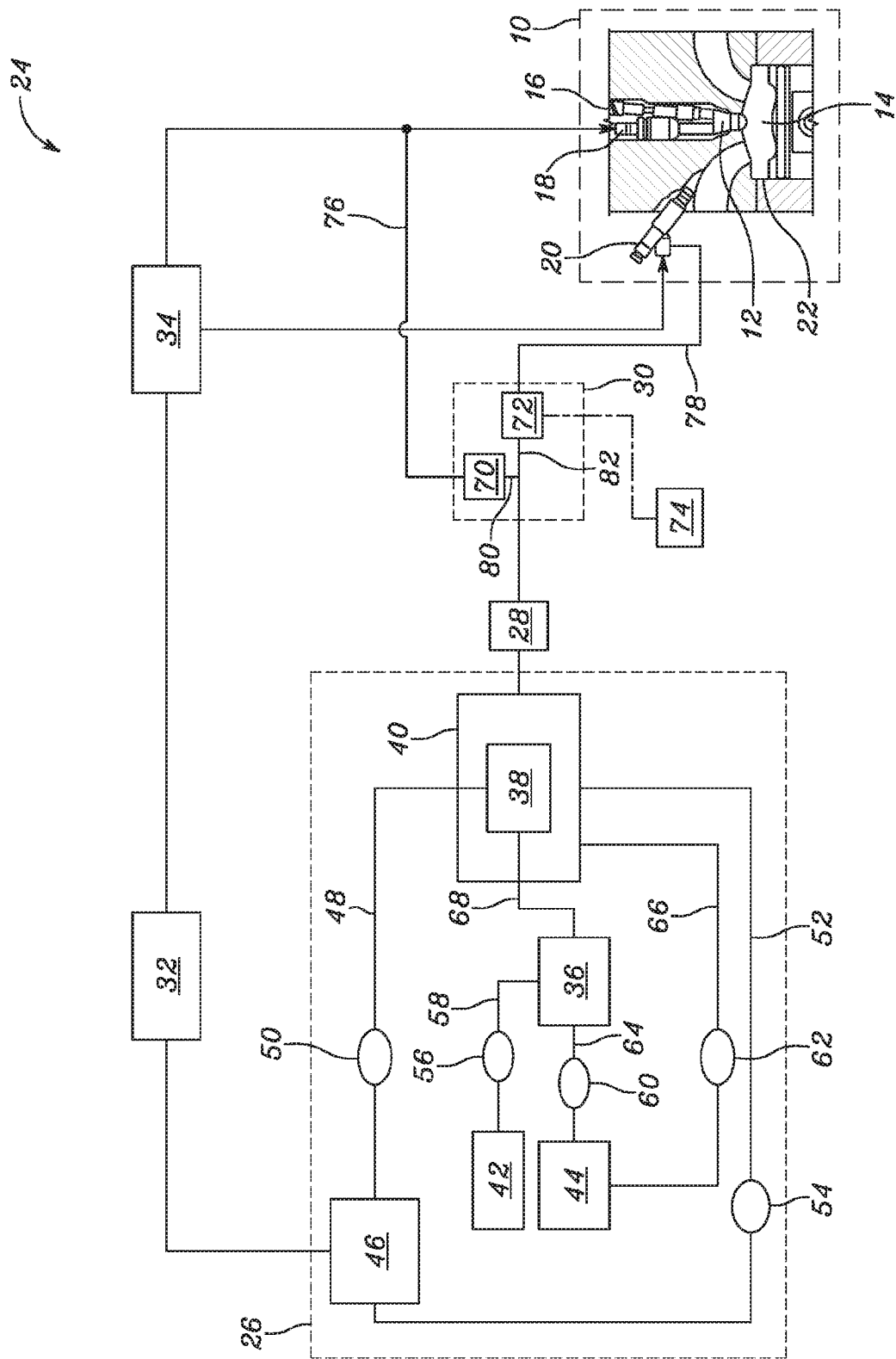
FIG. 2 is a schematic block diagram of a system having a fuel reformer module and a flow control assembly, in accordance with the concepts of the present disclosure.

Referring to FIG. 2, a system 24 for controlling flow of a gas stream into the pre-chamber 12 and the main chamber 14 of the engine 10 is illustrated. The system 24 includes the fuel reformer module 26, a cooler module 28, and a flow control assembly 30. The system 24 further includes a shut-off valve 32 and a regulator 34. The shut-off valve 32 is configured to regulate the supply of the fuel from a fuel source 46 to the engine 10. It should be noted that the shut-off valve 32 may be one of a poppet valve, a butterfly valve, a ball valve, or a globe valve. The regulator 34 is configured to regulate the pressure of the fuel to the engine 10. In an embodiment, the regulator 34 is an electronic gas regulator for controlling the inlet pressure of both the first fuel admission valve 18 and the second fuel admission valve 20. The system 24 may include various other components, such as pressure sensors, temperature sensors, etc. which are not included in FIG. 2 for the purpose of simplicity.

The fuel reformer module 26 is configured to provide the flow of the gas stream containing a hydrogen gas and a carbon monoxide gas to the engine 10. The fuel reformer module 26 is in fluid communication with the engine 10 to selectively inject the hydrogen gas and/or carbon monoxide gas into the pre-chamber 12 and/or the main chamber 14 of the engine 10. The fuel reformer module 26 includes a heat exchanger 36, an auto-thermal reformer (ATR) 38, and a steam reformer 40. The fuel reformer module 26 further includes an air source 42, a water source 44, and the fuel source 46.

The fuel, such as natural gas or LPG, from the fuel source 46 is provided to the steam reformer 40 and the ATR 38 via two conduits, i.e. a first fuel conduit 48 having a first fuel control valve 50, and a second fuel conduit 52 having a second fuel control valve 54. It will be apparent to one skilled in the art that the fuels (i.e., gaseous fuels) mentioned above have been provided only for illustration purposes. The fuels (i.e., the gaseous fuels) such as coal gas, gasoline etc. may also be utilized, without departing from the scope of the disclosure. The air source 42 is a source of compressed air used by the heat exchanger 36. Accordingly, the air source 42 supplies the air to the heat exchanger 36 using an air control valve 56 via an air conduit 58.

Further, the water source 44 supplies water to the heat exchanger 36 and the steam reformer 40 using a first water control valve 60 and a second water control valve 62 via a first water conduit 64 and a second water conduit 66 respectively. The water source 44 may provide water from a water reservoir which may he replenished regularly or as required. Additionally or alternatively, the water may be condensed or otherwise extracted from engine 10 exhaust gas. In one embodiment, water vapor present in the exhaust gas of the engine 10 may be mechanically separated using a substrate and then condensed and collected for use as water provided to the fuel reformer module 26 by the water source 44.

The ATR 38 may perform auto-thermal reforming by using heat from the exhaust gas of the engine 10 in order to carry out an endothermic reaction. In one example, the temperature of the exhaust gas of the engine 10 is approximately below 760° C. This temperature, however, at sufficient exhaust flow may provide heat sufficient to vaporize water for the steam reformer 40. The ATR 38 receives the fuel from the first fuel conduit 48 and also air, carrying oxygen ($O_2$), from a steam conduit 68 to carry out a main reaction. This main reaction is a partial oxidation of a hydrocarbon, for example, methane ($CH_4$) according to Equation 1:

$$4CH_4 + O_2 + 2H_2O \rightarrow 10H_2 + 4CO \qquad \text{Equation 1}$$

The reactions similar to the reaction in Equation 1 may generate heat, which is manifested as an effluent gas, hereinafter interchangeably referred as the gas stream, from the ATR 38. In the illustrated embodiment, the gas stream has temperature of approximately 1,200° C.

The gas stream from the ATR 38 is provided to the steam reformer 40 so that the temperature of the gas stream may be tempered and the production of the hydrogen gas may be increased. In the steam reformer 40, heat that was generated by the partial oxidation reactions occurring in the ATR 38 are absorbed, and the following reaction takes place according to the steam mole fraction and temperature of the participating compounds in accordance with Equations 2 and 3:

$$CH_4 + H_2O \rightarrow 3H_2 + CO \qquad \text{Equation 2}$$

$$CO + H_2O \rightarrow H_2 + CO_2 \qquad \text{Equation 3}$$

Water from the second water conduit 66 is provided through a ring injector (not shown) disposed within the steam reformer 40, which turns to steam when meeting the hot gas stream from the ATR 38 and also the additional steam passing through the ATR 38 from the steam conduit 68. Additional fuel is provided through the second fuel conduit 52 to supply the hydrocarbons required to carry out the reaction in Equation 2.

During operation, compressed natural gas used as an engine fuel is also supplied to the steam reformer 40 using the second fuel control valve 54 via the second fuel conduit 52. The fuel supply can be controlled by a butterfly valve, needle valve, ball valve or the like. The ring injector (not shown) can be formed as a ring that surrounds a tube not shown) and are placed close to the exit port of the ATR 38. When the gas stream exits from the ATR 38 with high temperature, water is injected via a ring of injectors to generate steam and simultaneously decrease the temperature of the gas stream.

As described, there are only fuel and water supplies to the steam reformer 40. An air supply, although optional for additional cooling, is not required for the steam reformer 40. It is noted that the ratio of the carbon monoxide gas to the hydrogen in the final gas stream from the steam reformer 40 can be adjusted by controlling fuel and steam supplied to both the ATR 38 and the steam reformer 40 by appropriate control of the various control valves by a controller (not shown). The controller is associated with the engine 10, the fuel reformer module 26, and various sensors for providing information indicative of exhaust gas temperature, air temperature, water temperature, and other parameters such that the controller may provide command signals to the various valves selectively controlling the flow of air, water and fuel. In an embodiment, the controller is an electronic controller that is coupled with an ECM of the engine 10 for carrying out various operations.

A vast majority of the heat generated in the ATR 38 can be recuperated by encaging the ATR 38 within the steam reformer 40. Further, the gas stream flows through the exit port of the ATR 38 and enters the steam reformer 40. A catalyst substance of the steam reformer 40 is placed between the external surface of ATR 38 and the internal surface of the steam reformer 40 such that the gas stream is in contact with the catalyst as the gas stream travels along the steam reformer 40.

The cooler module 28 is positioned downstream of the fuel reformer module 26 with respect to the flow of the gas stream. The cooler module 28 is configured to control the temperature of the gas stream exiting from the steam reformer 40. The cooler module 28 reduces temperature of the gas stream before supplying the gas stream to the flow control assembly 30. The cooler module 28 may include any charge-air cooler known in the art. In an embodiment, the temperature may be maintained within a range of about

[20-45 deg. C.] for increasing the density of the charged mixture to combustion chambers.

The flow control assembly 30 is positioned downstream of the cooler module 28 and upstream of the combustion chambers, i.e. the pre-chamber 12, and the main chamber 14 with respect to the flow of the gas stream. The flow control assembly 30 is configured to supply a first effluent stream to the pre-chamber 12 via a first conduit 76. Further, the flow control assembly 30 is configured to supply a second effluent stream to the main chamber 14 via a second conduit 78. The supply of the first and second effluent streams is conducted in such a way that a concentration of the hydrogen gas in the first effluent stream is greater than a concentration of the hydrogen gas in the second effluent stream. Whereas, a concentration of the carbon monoxide gas in the first effluent stream is lesser than a concentration of the carbon monoxide gas in the second effluent stream.

The flow control assembly 30 includes a membrane element 70. The membrane element 70 includes a number of apertures sized so as to allow more molecules of the hydrogen gas to pass therethrough and into the first conduit 76 connected to the pre-chamber 12. In an embodiment, the membrane element 70 includes selectively permeable elements that are disposed in a longitudinal or helical orientation within housing (not shown) and are ported or sealed at each end. Accordingly, the membrane element 70 may include hollow, porous, coated tubes through which the hydrogen gas permeates outwardly relatively rapidly, while other gases permeate outwardly comparatively slowly. Alternatively, the flow control assembly 30 may include a filter element (not shown) or any other known component to separate and thus increase the concentration of the hydrogen gas through the first conduit 76 as against the concentration of the hydrogen gas in the second conduit 78. It should be noted that the membrane element 70 does not purify the first effluent stream, but only increases a concentration of the hydrogen gas in the first effluent stream as compared to that in the second effluent stream.

The flow control assembly 30 further includes a valve 72 fluidly coupled to the membrane element 70. The valve 72 may be embodied as a butterfly valve or any other suitable flow control device. The valve 72 may be operated to change a pressure on lines 80, 82. Based on a position of the valve 72, in one situation, the valve 72 may cause a high back pressure to be created in the line 82. When the pressure in the line 82 increases, the pressure in the line 80 also increases, but the pressure in the line 80 is lower than that of the line 82. As a result, the gas stream from the cooler module 28 is forced towards the membrane element 70 as the gas stream flows to a low pressure direction. The membrane element 70 allows more molecules of the hydrogen gas to enter into the first conduit 76 and further flow towards the pre-chamber 12.

The increased back pressure in the line 80 may cause the generally smaller molecules of the hydrogen gas in the gas stream to be separated therefrom as the gas stream passes through the membrane element 70 causing the first effluent stream to flow towards the pre-chamber 12 via the first conduit 76 and the second effluent stream to flow towards to the main chamber 14 via the second conduit 78. Moreover, the first effluent stream has the higher concentration of the hydrogen gas and lower concentration of the carbon monoxide gas and is supplied to the pre-chamber 12 of the engine 10. The second effluent stream has the lower concentration of the hydrogen gas and the higher concentration of the carbon monoxide gas and is supplied to the main chamber 14 of the engine 10. In one embodiment, the valve 72 may be operated manually. It should be noted that since the valve 72 may be embodied as the butterfly valve, the butterfly valve may not completely closed due to its inherent configuration, allowing passage of the second effluent stream to the main chamber 14.

Additionally or optionally, the flow control assembly 30 may further include a control module 74 communicably coupled to the valve 72. In this situation the operation of the valve 72 is controlled by the control module 74 to control the separation of the gas stream into the first and second effluent streams. More particularly, the control module 74 may send command signals to the valve 72 for operation thereof in other embodiments, the control module 74 may operate the valve 72 using a feedback control mechanism for controlling the supply of the first and second effluent streams into the pre-chamber 12 and the main chamber 14 of the engine 10 respectively. Accordingly, the control module 74 may monitor the concentration of the hydrogen gas and the carbon monoxide gas in any one or both the lines 80, 82 of the T-junction and correspondingly change the operation the valve 72.

In an embodiment, the control module 74 is an electronic controller that is remotely coupled with an ECM of the engine 10 for carrying out various operations. Alternatively, the control module 74 may also be integrated within the valve 72 for controlling the operations, without departing from the scope of the disclosure.

The control module 74 may be a logic unit using any one or more of a processor, a microprocessor, and a microcontroller. The control module 74 may be based on an integrated circuitry, discrete components, or a combination of the two. Further, other peripheral circuitry, such as buffers, latches, switches, and the like may be implemented within the control module 74 or separately connected to the control module 74. The control module 74 may also be referred as an Engine Control Unit (ECU). It will be apparent to one skilled in the art that the control module 74 mentioned above may be an individual component which is in communication with other circuitries of the system 24.

INDUSTRIAL APPLICABILITY

The flow control assembly 30 supplies the first effluent stream and the second effluent stream to the pre-chamber 12 and the main chamber 14 respectively to perform lean burn combustion. The flow control assembly 30 supplies more of the hydrogen gas to the pre-chamber 12 than the main chamber 14 thereby improving the combustion stability. Moreover, the introduction of more of the hydrogen gas into the pre-chamber 12 stabilizes the combustion process even when a fuel of approximately 1-2% of a total fuel delivered to all the cylinders is injected into the pre-chamber 12 due to high flame speed of the hydrogen gas. More of the hydrogen gas is introduced into the pre-chamber 12 to facilitate use of leaner fuel mixtures to ignite combustion in the pre-chamber 12 and promote lean burn ignition.

Both the hydrogen gas and the carbon monoxide gas in the main chamber 14 increase the flame propagation speed, and hence generate a stable combustion condition for a lean air fuel mixture in the main chamber 14. Compared to the pre-chamber 12, the main chamber 14 has many ignition sources, such as partially burned chemical radicals, while the pre-chamber 12 usually has one or a few ignition source (i.e. a spark plug). It is desired to increase the concentration of the hydrogen gas in the first effluent stream to ensure the first ignition in the pre-chamber 12.

In a typical lean burn combustion solution, the lean air fuel mixture is only provided to the main chamber 14 and a stoichiometric or a rich air fuel mixture is provided to the pre-chamber 12 to ensure stable ignition in the pre-chamber 12. This technology enables the pre-chamber 12 to use the lean air fuel mixture as well.

The flow control assembly 30 may reduce the emissions without requiring aftertreatment systems (such as a three-way catalyst aftertreatment or lean Nox catalyst). Further, the present disclosure minimizes the fuel consumption, and thereby saves operational cost. Furthermore, the present disclosure may lower the exhaust temperature and improve the life of various components of the engine 10. Use of leaner gaseous fuels may reduce peak combustion temperatures within plug combustion chamber, thereby increasing life of the spark plug 16.

Recitation of ranges of values, temperatures herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A system for controlling a flow of a gas stream into a plurality of combustion chambers of an engine, the system comprising:

a fuel reformer module configured to provide the flow of the gas stream containing hydrogen gas and carbon monoxide gas;

a cooler module positioned downstream of the fuel reformer module with respect to the flow of the gas stream, the cooler module configured to control a temperature of the gas stream; and a flow control assembly positioned downstream of the cooler module and upstream of the plurality of combustion chambers with respect to the flow of the gas stream, the flow control assembly configured to:

supply a first effluent stream to a pre-chamber of the plurality of combustion chambers; and supply a second effluent stream to a main chamber of the plurality of combustion chambers, wherein a concentration of the hydrogen gas in the first effluent stream is greater than a concentration of the hydrogen gas in the second effluent stream, and wherein a concentration of the carbon monoxide gas in the first effluent stream is lesser than a concentration of the carbon monoxide gas in the second effluent stream.

2. The system of claim 1, wherein the flow control assembly includes any one of a membrane element and a filter element.

3. The system of claim 2, wherein the flow control assembly further includes a valve fluidly coupled to the any one of the membrane element and the filter element.

4. The system of claim 3, wherein the flow control assembly further includes a control module communicably coupled to the valve.

* * * * *